United States Patent [19]

Ricaud et al.

[11] Patent Number: 5,339,744
[45] Date of Patent: Aug. 23, 1994

[54] BAGGAGE RACK UNDER FLAP FOR THE PASSENGER SPACE OF A RAIL VEHICLE

[75] Inventors: Patrick Ricaud, Perigny; Bernard Mormede, La Jarne, both of France

[73] Assignee: GEC Alsthom Transport SA, Paris, France

[21] Appl. No.: 16,939

[22] Filed: Feb. 12, 1993

[30] Foreign Application Priority Data

Feb. 14, 1992 [FR] France .................. 92 01697

[51] Int. Cl.⁵ .................................. B61D 49/00
[52] U.S. Cl. .................................. 105/332
[58] Field of Search ............ 105/332, 338, 337, 329.1, 105/323; 49/371, 381; 362/73, 66, 74

[56] References Cited

U.S. PATENT DOCUMENTS

| 1,757,860 | 5/1930 | Hall et al. | 49/371 |
|---|---|---|---|
| 2,843,729 | 7/1958 | Materese . | |
| 3,210,875 | 10/1965 | Schwenkler | 362/74 |
| 3,906,670 | 9/1975 | Burton | 49/381 |
| 4,157,584 | 6/1979 | Bhatt | 362/74 |
| 4,935,129 | 6/1990 | Wang | 49/371 |
| 4,947,762 | 8/1990 | Perzl et al. | 362/73 |
| 5,038,256 | 8/1991 | Burkarth | 362/74 |

FOREIGN PATENT DOCUMENTS 2542828 9/1984 France .

Primary Examiner—Mark T. Le
Attorney, Agent, or Firm—Sughrue, Mion, Zinn, Macpeak & Seas

[57] ABSTRACT

A baggage rack under flap for the passenger space of a rail vehicle including a plurality of flaps placed end to end, the baggage rack being supported by brackets, the flap being longitudinally hinged to be capable of tilting and to give access to the portion situated beneath the baggage rack, the flap being held in a closed position by locking, the flap being made up of at least two longitudinal elements, each element being hinged along one of its longitudinal edges by a hinge, the other longitudinal edge of said element being fitted with locking means, the hinge being adjustable in position relative to the brackets to enable the flaps to be aligned.

8 Claims, 3 Drawing Sheets

BAGGAGE RACK UNDER FLAP FOR THE PASSENGER SPACE OF A RAIL VEHICLE

The invention relates to a baggage rack under flap for the passenger space of a rail vehicle.

BACKGROUND OF THE INVENTION

The baggage racks of rail vehicle passenger spaces are constituted by supports, e.g. sheets of glass, held by brackets that are regularly spaced apart and fixed to the side walls of the vehicles. Flaps are generally disposed beneath the baggage racks. They are provided both for reasons of appearance and for mechanical reasons. They serve to support reading lights, switches, and sound-system loudspeakers, and to mask the brackets and the electrical components situated on the upper portions of the side faces (fluorescent tubes, converters, curtain roller mechanisms, electric cables, etc.).

Such a flap is generally constituted by an aluminum section member connected firstly to the face of the vehicle and secondly to the baggage rack support. One of the connections constitutes a hinge and the other a lock. When unlocked, the flap swings down so as to give access to the equipment situated beneath the baggage rack and normally hidden by the flap.

Until now, flaps have been strips of width that is relatively narrow compared with their length. For reasons of appearance, it is now desired that flaps should be wider so as to cover the entire underside of the baggage rack, unlike presently available devices. It is also desired that such flaps should be more curved so as to increase the volume available for passengers. This further increases the developed length of such a flap.

Wide flaps pose a certain number of problems. When they are unlocked to gain access to the hidden parts, they have insufficient clearance because the headrests of the seats prevent them from swinging down fully. Such insufficient clearance makes it difficult to gain access to the equipment housed beneath the baggage rack.

Another problem arises in fabricating the flaps which are normally implemented in the form of an aluminum section. The maximum width of an extrusion die is too limited for making wide flaps.

On installation, another problem arises, namely that of aligning the flaps properly. A flap may be more than 2 meters (m) long. It then becomes very difficult to ensure good continuity between flaps that are not only wide but also highly curved. In addition to this visible defect, there then also exists a clear gap from which light emitted by the fluorescent tubes can diffuse. Such poor alignment is unacceptable given the quality of appearance that is required.

OBJECT AND SUMMARY OF THE INVENTION

The invention seeks to mitigate these drawbacks. It relates to a baggage rack under flap constituted by at least two hinged longitudinal elements, each element being capable of being locked. An alignment mechanism is provided so as to obtain proper alignment of the flaps when they are installed.

The invention thus provides a baggage rack under flap for the passenger space of a rail vehicle including a plurality of flaps placed end to end, the baggage rack being supported by brackets, the flap being longitudinally hinged to be capable of swinging down and to give access to the portion situated beneath the baggage rack, the flap being held in a closed position by locking, the flap being made up of at least two longitudinal elements, each element being hinged along one of its longitudinal edges by hinge means, the other longitudinal edge of said element being fitted with locking means, the hinge means being adjustable in position relative to the brackets to enable the flaps to be aligned. This disposition of the flap as a plurality of portions provides the advantage of allowing large clearance to each of the portions.

The hinge means may be disposed between the flap and the baggage rack. The advantage of this is to make the hinge invisible and to ensure that the profile of a flap is continuous.

Preferably, the flap comprises two longitudinal elements hinged along their adjacent longitudinal edges. Each element can thus be pre-equipped independently.

Advantageously, the hinge is of the type having a hinge pin, the two longitudinal elements being hinged about a common pin. Because of its second moment of area, such a hinge provides the advantage of imparting good stiffness to the flap.

The hinge may comprise fixed portions supporting said hinge pin and held by support pieces fixed to the brackets.

The support pieces may be adjustable on the brackets to enable angular displacement of the hinge pin in a plane transverse to the rail vehicle. The fixed portions of the hinge may be adjustable on the support pieces by translation movement in a plane transverse to the rail vehicle. By these means, all of the possible locations for the axis of the hinge are covered, thereby making it possible to align a flap accurately relative to the adjacent flaps.

The flap may carry fixing means for electric cables. This makes it possible to reduce the lengths of the electrical connections between the side faces and the electrical elements carried by the flaps. A plurality of electric wires can be caused to run from a single electrical terminal, thereby avoiding multiple connections all the way to the lateral faces. Cable clamps may also be used, enabling electrical cables to be supported.

BRIEF DESCRIPTION OF THE DRAWINGS

The invention will be better understood and other advantages and features thereof will appear on reading the following description given by way of non-limiting example and made with reference to the accompanying drawings, in which.

MORE DETAILED DESCRIPTION

Figure 1:
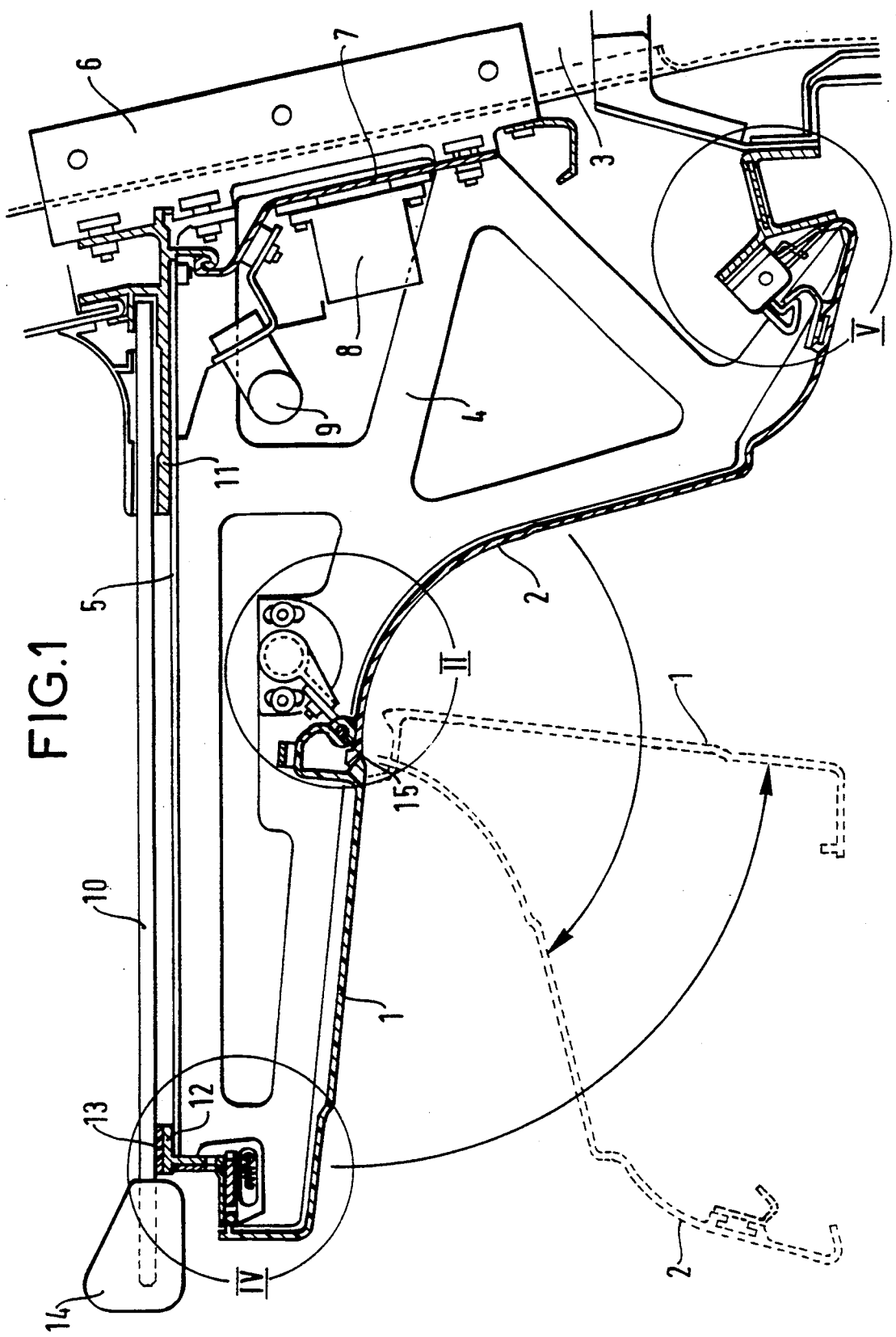
FIG. 1 is a cross-section through a baggage rack under flap of the invention.

The cross-section view of FIG. 1 shows a portion of a side face 3 of a rail vehicle onto which brackets are fixed, such as the bracket referenced 4. The bracket comprises a plane vertical portion terminated by a horizontal portion 5 so that it appears generally T-shaped when seen end on. A bracket may be fixed to a side face via an intermediate piece 6 which is adjusted on assembly so as to ensure that all of the brackets are placed at the same level. The intermediate piece 6 also supports a lighting module 7 which includes a static converter 8 and a fluorescent tube 9.

The brackets 4 support the baggage rack 10 which may be constituted, for example, by a plate of tempered glass. Adjacent to the side face, the plate 10 is held by a rear support profile 11. Towards the inside of the vehicle, the plate 10 rests on a front support profile 12 via a rubber abutment 13, and it is terminated by a baggage rack front member 14. The profiles 11 and 12 may be made of aluminum.

The brackets 4 and the equipment close thereto are masked by the flap of the invention. In the example shown, the flap comprises two longitudinal elements 1 and 2 shown in solid lines for the flap in its locked position. The elements 1 and 2 are hinged together along their adjacent longitudinal edges about a pin 15 parallel to the side face 3. The hinge pin is disposed between the flap and the baggage rack, thereby giving the flap a uniform appearance without any sign of discontinuity.

The hinge device and the locking device are described in greater detail with reference to the following figures. The elements 1 and 2 of the flap are shown in dashed lines in their respective maximally-open positions when they are unlocked. In its open position, the element 2 comes into abutment against the element 1 near the hinge axis.

Figure 2:
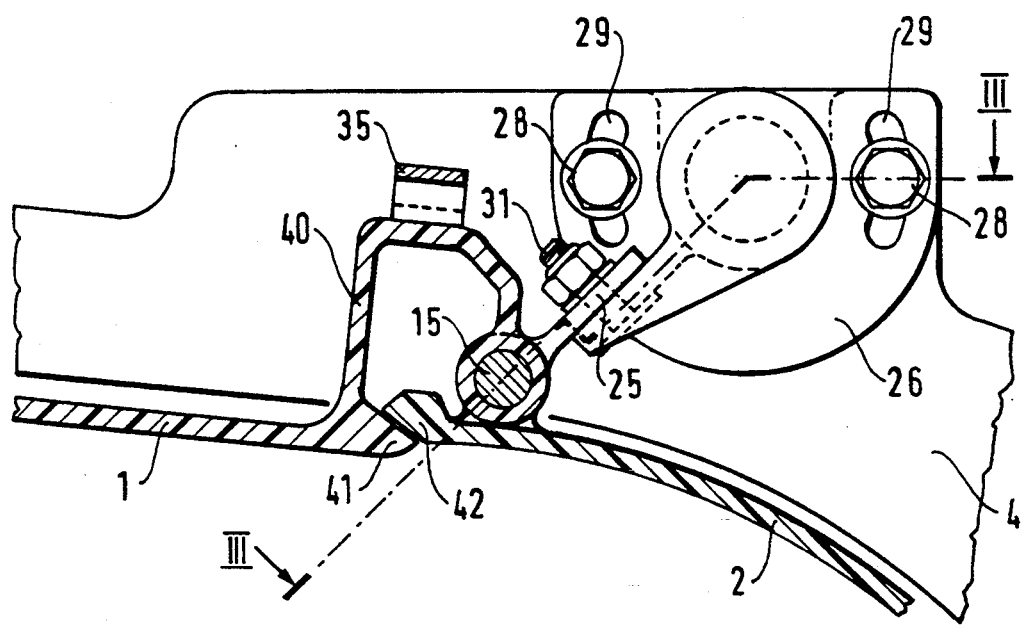
FIG. 2 is a detail view showing the hinge of the flap elements.
Figure 3:
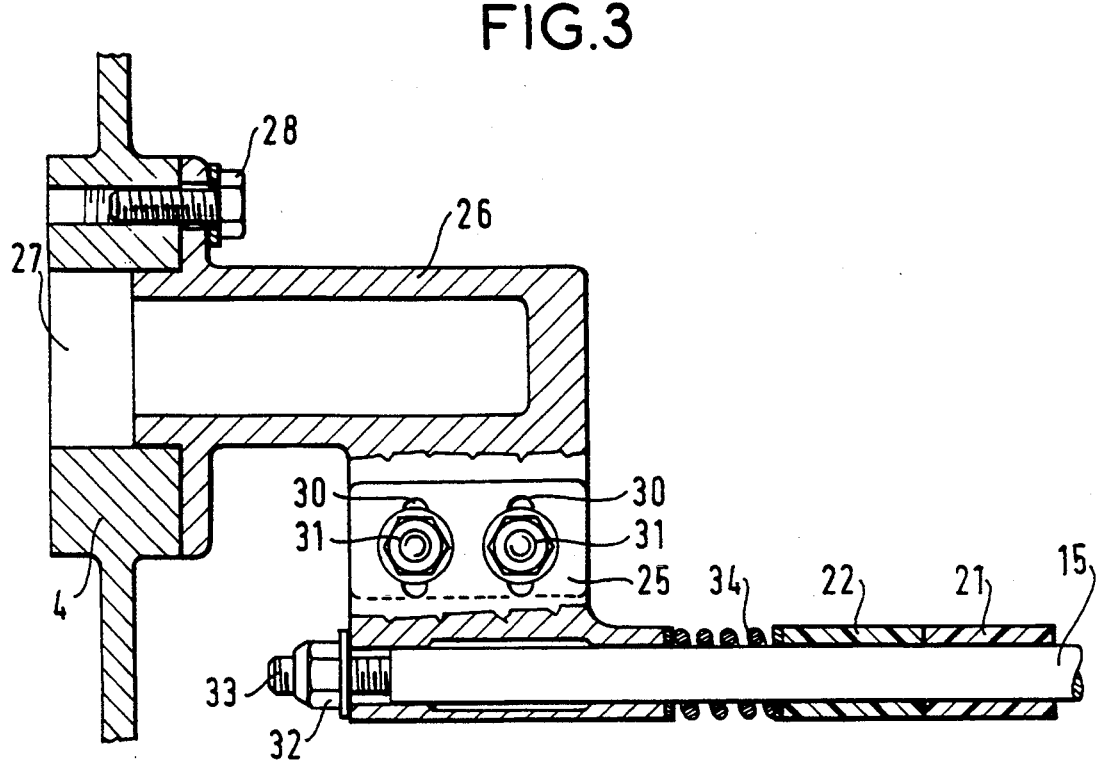
FIG. 3 is a view corresponding to section III—III on FIG. 2.

FIG. 2 shows the hinge between the elements 1 and 2 of the flap more clearly. This hinge is advantageously of the type having a hinge pin, with the pin 15 passing in alternation through all of the knuckles 21 of the element 1 and 22 of the element 2 (see FIG. 3).

The fixed portions 25 of the hinge supporting the pin 15 are fixed to support pieces 26, themselves fixed to the brackets 4. The support pieces 26 rest in circular recesses 27 integrated in the brackets 4. The support pieces 26 are fixed to the brackets by screws 28 that pass through slots 29 in the support pieces. As can be seen in FIG. 2, these slots allow the support pieces a certain degree of freedom in rotation during adjustment.

The fixed portions 25 are fixed to the support pieces 26 by bolts, with the bolts 31 passing through the fixed portions via slots 30, which slots allow the fixed portions a certain amount of freedom in translation during adjustment.

The pin 15 is held in place by screwing nuts 32 onto its ends 33. A spring 34 may be mounted on the pin to ensure that the hinge knuckles are properly juxtaposed.

As can be seen in FIG. 2, the flap elements may support clamps 35 for holding electrical cabling. They also support various fittings (not shown) such as reading lights, loudspeakers, and switches. Because of the cable clamps, cabling can be optimized for flap swinging (by reducing loops of slack). This facilitates maintenance. It is necessary only to open that element of the flap which corresponds to the equipment to be inspected.

The disposition shown in FIGS. 1 and 2 for hinging the flaps on a common pin is particularly advantageous. The generally channel-section margin 40 of the element 1 enables the elements 1 and 2 to pivot without interfering with each other. The chamfered shape given to the edges 41 and 42 of the elements 1 and 2 provides good overlap when the elements are locked in place and prevents light from the tube 9 from escaping between them.

Figure 4:
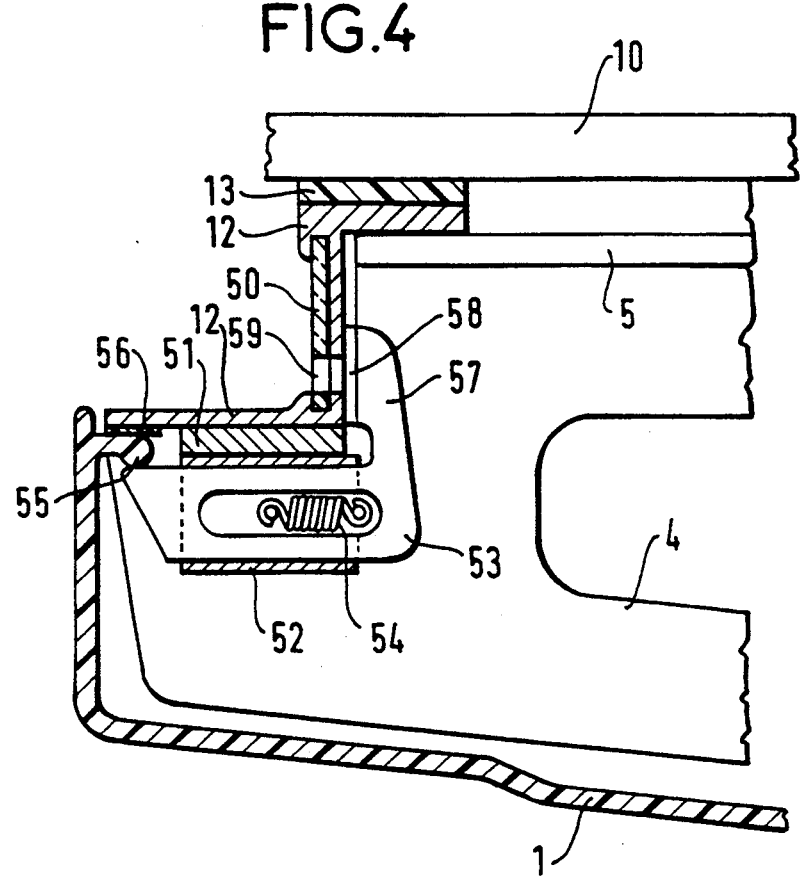
FIGS. 4 and 5 are detail views showing the locking devices for a flap of the invention.

FIG. 4 shows the device for locking the element 1 of the flap. The front profile 12 has slots that are uniformly distributed along its entire length. Transparent plates 50, e.g. of polycarbonate, are disposed on the vertical portion of the profile 12 to allow the light from the tube 9 to diffuse into the vehicle. The locking devices are disposed at determined locations. They are fixed to the brackets 4 by supports 51. Each support 51 is provided with a sleeve 52 in which a latch 53 can slide. A spring 54 has one of its ends connected to the sleeve 52 and its other end connected to the latch 53. It thus exerts a force on the latch urging it towards the inside of the vehicle.

The element 1 of the flap has a vertical margin which masks the bracket 4 and its surroundings up to the front support profile 12. The margin of the element 1 is provided with an inwardly-directed rim 55 that is engaged between the front support profile 12 and the latch 53 when the element 1 is in its closed position. A rubber abutment 56 damps the pressure exerted by the rim 55 on the front support 12.

The latch 53 includes an operating arm 57 having a face that comes into contact with the rear face of the vertical portion of the front support profile 12 via a protective rubber abutment 58. At this location, the profile and the transparent plate 50 are provided with a hole 59. The element 1 of the flap is opened by engaging a screwdriver blade, for example, into the hole 59 to push back the latch 53 and release the rim 55. The element 1 is closed by being pushed upwards, with the rim 55 then pushing back the latch 53 when it comes into contact with the sloping front face of the latch.

Figure 5:
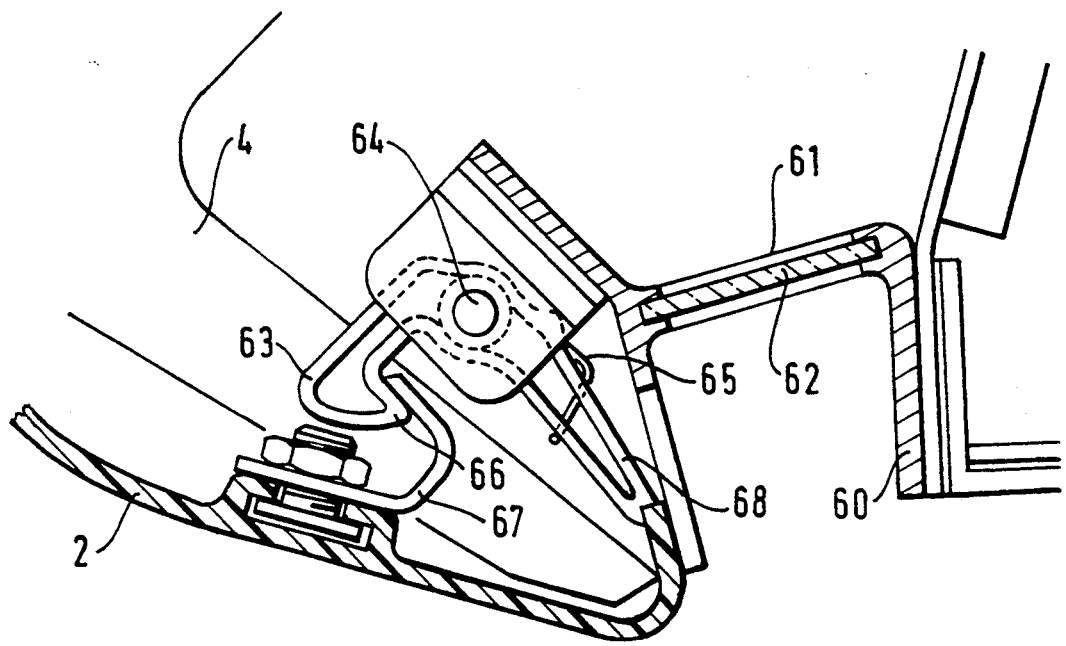

FIG. 5 shows the locking device for the element 2 of the flap. A lock support 60 of aluminum is fixed on the side face of the vehicle. The support has a face 61 that faces towards the top of the vehicle, and that is provided with regularly spaced apart openings along its entire length. Transparent plates 62, e.g. of polycarbonate, occupy said openings while allowing light from the tube 9 (see FIG. 1) to be diffused along the side face of the vehicle. The support 60 is provided with a spring hook type of lock 63. It can rock backwards and forwards about a pin 64. A spring 65 urges it to rock anti-clockwise.

When the element 2 of the flap is in its closed position, the hook 66 of the lock holds a curved piece 67 which is fixed to the element 2. By exerting a downwards force on the rear portion 68 of the lock 63, it is caused to rock clockwise, thereby releasing the element 2. The element 2 is closed merely by pushing it upwards against the lock.

Each of the elements of the flap remains in its open position under gravity, thereby avoiding any need to use a linkage or other prop system that is normally necessary.

The ambit of the present invention extends to flaps made of more than two elements, by increasing the number of hinges and the number of locking devices. However, it appears that a flap made of two longitudinal elements represents the best solution in the present case.

We claim:

1. An apparatus including a baggage rack having an under flap for a longitudinally extending passenger space of a rail vehicle containing a plurality of such under flaps placed end to end, the baggage rack being supported by a bracket fixed to the vehicle, the flap being longitudinally hinged by a hinge to be capable of swinging down and to give access to an area situated beneath the baggage rack, the flap being held in a closed position by locking, said under flap comprising:

two longitudinal flap elements hinged about a common hinge pin of the hinge;

fixed hinge portions supporting said hinge pin and held by support pieces fixed to said bracket, said hinge pin and hinge portions defining said hinge;

first means for adjusting said support pieces on said bracket to enable angular displacement of said hinge pin in a plane transverse to the passenger space; and second means for adjusting said fixed hinged portions on said support pieces by translation movement in a plane transverse to the passenger space.

2. The apparatus according to claim 1, wherein the hinge is disposed between the flap and the baggage rack.

3. The apparatus according to claim 1, wherein each of said longitudinal flap elements is hinged along one of its longitudinal edges about said common hinge pin, the other longitudinal edge of each flap element being fitted with locking means, said hinge being adjustable in position relative to said bracket to enable the plurality of flaps to be aligned.

4. The apparatus according to claim 3, comprising means mounted on said flap, for supporting electric cables.

5. An apparatus including a baggage rack having an under flap for a longitudinally extending passenger space of a rail vehicle including a plurality of such under flaps placed end to end, the baggage rack being supported by at least one bracket, the under flap being longitudinally hinged to be capable of swinging down and to give access to a portion situated beneath the baggage rack, the under flap being held in a closed position by locking, said under flap comprising at least two longitudinal flap elements, each said flap element being hinged along one of its longitudinal edges by hinge means mounted on said bracket, the other longitudinal edge of each said flap element being fitted with locking means for locking the element in said closed position, and means for adjusting the hinge means in position relative to said at least one bracket to enable said plurality of flaps to be aligned;

wherein said at least two flap elements are hinged along their adjacent longitudinal edges; and wherein the hinge means comprises a hinge pin about which said at least two flap elements are commonly hinged.

6. The apparatus according to claim 5, wherein the hinge means comprises fixed portions supporting said hinge pin and held by support pieces fixed to the bracket.

7. The apparatus according to claim 6, wherein said adjusting means adjusts the support pieces on the bracket to enable angular displacement of the hinge pin in a plane transverse to the passenger space.

8. The apparatus according to claim 6, wherein said adjusting means adjusts the fixed portions of the hinge means on the support pieces by translation movement in a plane transverse to the passenger space.

* * * * *